Aug. 28, 1951   F. C. WALDO   2,566,102
HYDROSTATIC LEVEL
Filed May 24, 1948

INVENTOR.
FORD C. WALDO
BY Cook and Schermerhorn
ATTORNEYS

Patented Aug. 28, 1951

2,566,102

UNITED STATES PATENT OFFICE 2,566,102

HYDROSTATIC LEVEL

Ford C. Waldo, Portland, Oreg.

Application May 24, 1948, Serial No. 28,940

1 Claim. (Cl. 33—209)

This invention relates to a hydrostatic level of the type having vertical transparent sight tubes interconnected by a flexible hose for use in leveling work.

Previously known hydrostatic level devices have generally been of rather delicate and complicated construction which has been expensive to manufacture and impractical for most outdoor work. Heretofore the two sight tubes have been mounted on identical low bases to be supported close to the ground whereby the apparatus could not be used conveniently to measure a difference in elevation greater than the height of the sight tubes. Another limitation to the use of known devices is the fact that they have been more or less permanently attached to a relatively short length of small tubing which thereby serves to limit the distance between two points whose elevations could be compared.

The general object of the present invention is to provide an inexpensive and rugged hydrostatic leveling apparatus which will overcome the various shortcomings of conventional devices pointed out hereinabove. Specific objects are to provide a hydrostatic leveling apparatus which is not limited to measuring differences in elevation amounting to less than the height of the sight tube, and to provide an apparatus of the type described in which the two liquid level sight tubes may easily be connected together by one or more lengths of hose to span a considerable distance without altering the structure of the apparatus, and in the attainment of the foregoing objects still further and more specific objects of the invention are to provide a novel form of body member for each of the vertical sight tube devices having either a permanent or removable low base to support the body adjacent the ground and having means for connection with a vertical staff to support one or both of the devices in an elevated position above the ground level, and to provide coupling means on the body members for connection with the opposite ends of a common garden hose to obviate the use of special tubing.

The present apparatus comprises, generally, a pair of leveling devices embodying vertical sight tubes adapted to be connected with the opposite ends of a common garden hose, whereby any number of lengths of such hose may be connected together to place the two leveling devices as far apart as necessary. Inasmuch as garden hose is relatively inexpensive and usually available in different lengths without purchasing it especially for the present purpose, exact levels may be obtained at fairly distant points. In addition to a low base, means are provided on the body of each leveling device for supporting the device on a staff at a considerable elevation above the level of the point whose elevation is to be measured, thereby giving the apparatus special utility in grading terraces and digging drainage ditches and such work where there may be a difference in elevation of a number of feet between the point to be measured or controlled and a convenient bench mark or reference level. The utility of the older forms of hydrostatic level is thereby greatly extended, so that the proper grades and levels may be obtained by relatively inexpensive apparatus in the hands of unskilled workmen with substantially the same degree of precision heretofore obtained only by a skilled surveyor using costly surveying instruments.

The foregoing and other objects are attained in the preferred embodiments of the apparatus described in the following specification and illustrated on the accompanying drawings. It is to be understood, however, that various changes may be made in the construction and arrangement of parts, and that all such modifications within the scope of the appended claims are included in the invention.

Figure 1:
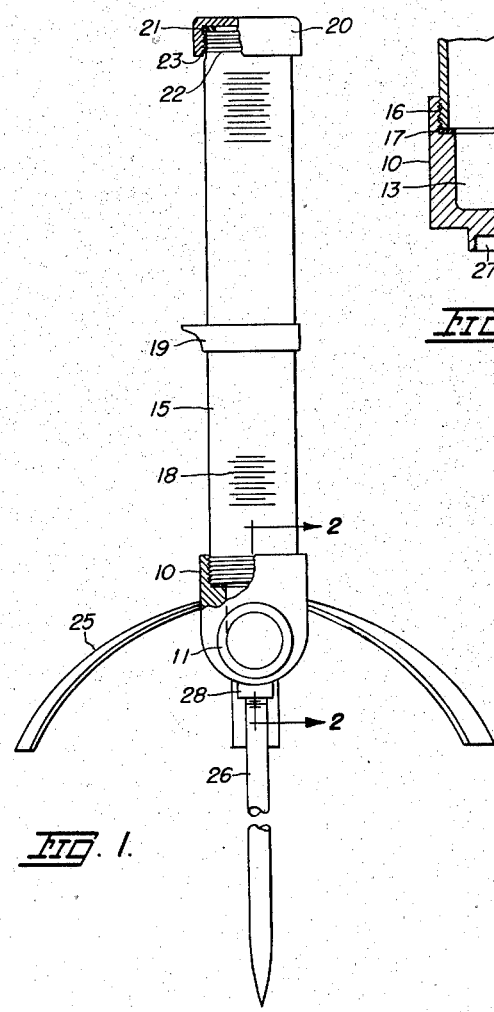
Figure 1 is an elevation view of one of the leveling devices of the present apparatus.
Figure 3:
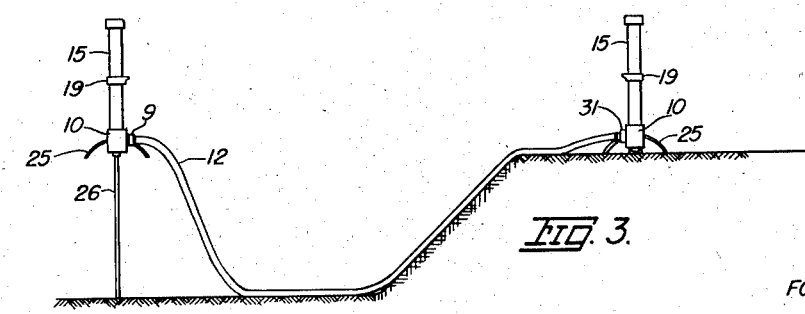
Figure 3 is a general view showing a pair of the devices of Figure 1 connected to the opposite ends of a garden hose to illustrate the use of the complete apparatus.

In Figure 1, the body member 10 of the device preferably constitutes an integral one-piece metallic casting. The body 10 is provided with a male hose coupling 11 designed to engage a standard female coupling element 9 on the end of a conventional garden hose 12, as shown in Figure 3. The coupling element 11 provides communication from the hose 12 through an internal cavity 13 to the lower end of a transparent vertical sight tube 15 which is preferably made of an unbreakable plastic material. The tube 15 is shown to have threaded engagement with the body 10 at 16, and the joint may be sealed with a gasket 17, but the tube may also be secured without a threaded connection. The tube 15 is preferably provided with graduations 18 and a sliding indicator 19 having frictional means to hold it in adjusted position on the tube.

The upper end of the tube 15 is sealed by a cap 20 having a gasket 21 to prevent loss of liquid from the apparatus when it is being moved about. When the device is in use, the cap 20 is unscrewed about one turn on the threads 22 to establish an air vent through a longitudinal groove 23 cut through the threads 22. To insure opening of this vent when the cap is only slightly unscrewed, the gasket 21 is preferably secured to the inside of the cap so that the gasket will be lifted off the upper end of the tube. Other sealing and venting arrangements may be employed on the upper end of the tube if desired.

In Figure 1, the body 10 is provided with a permanent low base comprising a plurality of integral feet 25, as shown. In most uses at least one of the two vertical sight tubes shown in Figure 3 may be supported on its permanent base 25, and when the difference in elevation of the two sight tubes is less than the height of the sight tubes both devices may rest on their bases 25. However, when the difference in elevation to be measured is greater than the length of the sight tubes, one of the devices is supported on a staff 26 which may comprise a metal rod of known length. The lower end of this rod is preferably pointed so that it may be pushed into the ground. The upper end of the staff or rod 26 is screw threaded to secure it in a similarly threaded socket 27 in an integral boss 28 on the bottom of the body 10.

Figure 2:
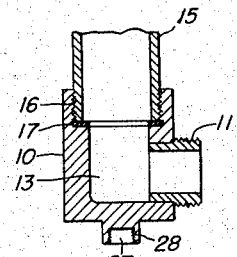
Figure 2 is a sectional view taken on the line 2—2 of Figure 1.

The companion device shown in Figure 3 for use on the other end of the hose is identical with the device shown in Figures 1 and 2, except that the male coupling 11 is provided with a female coupling member 31 for connection with the male coupling on the garden hose. To prepare the apparatus for use, both of the caps 20 are removed and water is run through the hose to remove all the air bubbles. Sufficient water is retained to fill the hose and both sight tubes to their mid points. Both caps 20 are then temporarily tightened so that the apparatus may be moved without spilling the water. When the apparatus is set up for use with both sight tubes at approximately the same level the caps 20 are loosened to open the vents.

Figure 3 shows how the apparatus may be used for measuring levels and grades where the elevation of the point or points to be measured differs from that of the reference point by an amount greater than the height of the sight tube 15. If, for example, it is desired to build a terrace or embankment to a certain height above a given level, the staff 26 may be pushed into the ground or supported in an auxiliary tripod to provide elevated support for one of the sight tube devices with the bottom of its permanent base 25 at the desired height of the terrace. Then the other device is set on top of the terrace as it is built up and when the liquid level attains the same height in the two sight tubes as measured by the graduations on the tubes, it is evident that the two bases 25 are then on the same level and the terrace has attained the desired height. The same procedure may be used for any fill or any leveling work where the reference elevation is below the surface to be measured.

In excavation work such as digging drainage ditches or basements, the reference level is usually above the surface to be measured, and then, instead of leaving the staff 26 stuck in the ground to provide a reference height for the sight tube, the pointed end of the staff is merely rested on the ground or inserted in a tripod to determine the level position of the water in the sight glass. In such case the other sight tube resting on its permanent base 25 constitutes the reference elevation. As the digging progresses, the device on the staff may be placed to one side where it will be out of the way but with the liquid at approximately the same level in both sight glasses to provide a rough indication of the amount of earth yet to be removed.

The present apparatus is also of particular advantage for obtaining the proper gradient in a drainage ditch and the like, where only a slight fall is desired, and also in general surface grading for drainage purposes. By placing one of the leveling devices at a reference elevation in a central position with respect to the line or area of digging, the other device may be extended out in opposite directions as far as the available length of hose will permit to obtain direct measurements of the difference in elevation which are visible on the sight tube and readily interpreted by unskilled workmen. With the present apparatus, the difference in elevation between the points to be graded and such a central reference point would be immaterial, provided that a sufficiently long staff 26 could be obtained to reach to the lower surface levels. Bench marks and other elevation reference points are often located considerably above or below the ground level where the work is to be done, and it will be apparent that the present apparatus provides means for compensating for the difference in elevation without requiring expensive apparatus or instruments, and without involving calculations which would be likely to introduce errors.

In digging branch drains and the like both the reference point and the working point may be in difficult positions in the bottoms of different trenches. In such case both sight tube devices may be mounted on staffs 26 of known length to support the sight tubes in convenient positions above the tops of the trenches.

Figure 4:
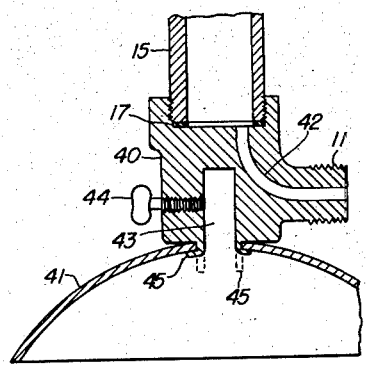
Figure 4 is a sectional view of a modification.

Figure 4 shows a two-piece form of construction having a body casting 40 integrally united in manufacture with a permanent base member 41. The body 40 has a small channel 42 disposed at one side of the casting to establish communication between the hose coupling 11 and the sight tube 15 whereby there is room in the body 40 for a socket 43 approximately centered under the sight tube. The socket 43 preferably has a smooth bore so that the rod or staff 26 may be driven into the ground before the body 40 is applied thereto. In such case, of course, the presence of the hose 12 would not permit rotation of the body 40 to make screw threaded connection with a non-rotatable staff, so the smooth bore 43 permits the body to be merely lowered on top of the staff after the latter has been driven into the ground. The body of the device is temporarily secured to the top of the staff by means of a set screw 44, thereby providing a quick detachable connection without relative rotation of the parts.

In the construction shown in Figure 4, the permanent base 41 constitutes a dished sheet metal stamping preferably circular in outline and having a circular hole in its center. The body 40 is cast with a circular rim or flange of metal 45 around the end of the socket 43 of a size to project through the circular hole in the base member. The parts are permanently secured together by deforming the material of the rim 45 over the base member by a form of swaging operation similar to that applied to the end of a hollow rivet. In this form of construction both the cast body member 40 and the stamped base 41 are individually very inexpensive, and they may be easily fastened together in a simple assembly operation.

Figure 5:
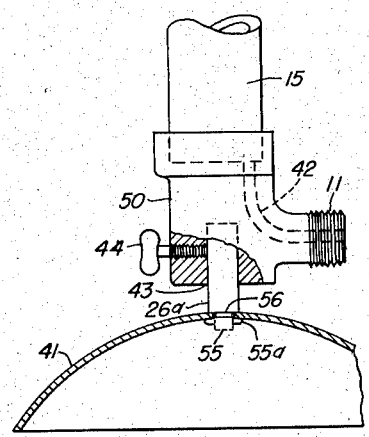
Figure 5 is a fragmentary view of another modification.

Figure 5 discloses another embodiment in which both the low and high bases are removable from the body of the device. The cast body 50 is quite similar to the body 40 in Figure 4 and like parts are identified by the same reference numerals. The low base 41a is identical with the previously described base 41 but instead of being attached to the body 50 it is secured to a short staff or post 26a of round bar stock having the same diameter as staff 26. The original end 55 of the post is reduced in diameter to enter the central hole in the base and is riveted over the base at 55a to secure the base against a shoulder 56 as shown. Thus either the staff 26 or 26a may be secured in the socket 43 as desired, whereby the original parts and replacement parts may be manufactured and sold individually according to the needs of the purchaser without requiring him to buy unnecessary parts.

The complete apparatus may include a number of staffs 26 of different lengths and possibly also a tripod support for holding a staff erect on a hard surface, but for many purposes, as shown in Figure 3, merely one staff and one low base would be sufficient. In any event the present apparatus eliminates the usual rubber hose as a necessary item of expense by utilizing any common garden hose which the purchaser would ordinarily already have.

The above described embodiments illustrate the principles of the invention, and other equivalent forms of construction will suggest themselves to persons skilled in the art.

Having now described my invention and in what manner the same may be used, what I claim as new and desire to protect by Letters Patent is:

In a hydrostatic level, a pair of castings, one of said castings being provided with a threaded male coupling for connection with a standard female coupling element on the end of a conventional garden hose, the other of said castings being provided with a threaded female coupling for connection with the standard male coupling element on the opposite end of the garden hose, a vertical sight tube mounted on each casting, a channel in each casting extending between the hose coupling and the sight tube, a socket in each casting to receive a detachable vertical staff for supporting said casting at an elevation above a ground surface, a low base member for supporting said casting adjacent a ground surface, an opening through said low base member in alignment with the socket for said staff, and means for securing said low base member in supporting relation to said casting.

FORD C. WALDO.

REFERENCES CITED

The following references are of record in the file of this patent:

UNITED STATES PATENTS

| Number | Name | Date |
|---|---|---|
| 413,103 | Straus | Oct. 15, 1889 |
| 630,856 | Brown | Aug. 15, 1899 |
| 762,072 | Lord | June 7, 1904 |
| 859,903 | Finer | July 9, 1907 |
| 919,934 | Nugent | Apr. 27, 1909 |
| 1,017,638 | McCoole | Feb. 13, 1912 |
| 1,042,248 | McGowan | Oct. 22, 1912 |
| 1,175,352 | Hand | Mar. 14, 1916 |
| 2,231,162 | Husby | June 26, 1917 |
| 2,475,007 | Carlson | July 5, 1949 |